US012810878B2

(12) United States Patent
Purnhagen et al.

(10) Patent No.: US 12,810,878 B2
(45) Date of Patent: *Nov. 24, 2026

(54) STEREO AUDIO ENCODER AND DECODER

(71) Applicant: DOLBY INTERNATIONAL AB, Dublin (IE)

(72) Inventors: Heiko Purnhagen, Sundbyberg (SE); Kristofer Kjoerling, Solna (SE)

(73) Assignee: DOLBY INTERNATIONAL AB, Dublin (IE)

(*) Notice: Subject to any disclaimer, the term of this patent is extended or adjusted under 35 U.S.C. 154(b) by 156 days.

This patent is subject to a terminal disclaimer.

(21) Appl. No.: 18/808,460

(22) Filed: Aug. 19, 2024

(65) Prior Publication Data

US 2025/0054506 A1 Feb. 13, 2025

Related U.S. Application Data

(60) Continuation of application No. 18/295,701, filed on Apr. 4, 2023, now Pat. No. 12,080,307, which is a (Continued)

(51) Int. Cl.
*G10L 19/06* (2013.01)
*G10L 19/008* (2013.01)
(Continued)

(52) U.S. Cl.
CPC ............ *G10L 19/06* (2013.01); *G10L 19/008* (2013.01); *G10L 19/02* (2013.01); (Continued)

(58) Field of Classification Search
CPC ....... G10L 19/008; G10L 19/02; G10L 25/06; G10L 19/167; G10L 19/0204; (Continued)

(56) References Cited

U.S. PATENT DOCUMENTS 5,796,844 A 8/1998 Griesinger
6,680,972 B1 1/2004 Liljeryd
(Continued)

FOREIGN PATENT DOCUMENTS

BR pi0621485 A 12/2011
CA 2793140 C 5/2016
(Continued)

OTHER PUBLICATIONS

Anonymous: "A/52B, ATSC Standard, Digital Audio Compression Standard (AC-3, E-AC-3) revision B" Jun. 14, 2005.
(Continued)

*Primary Examiner* — Vivian C Chin
*Assistant Examiner* — Douglas J Suthers

(57) ABSTRACT

The present disclosure provides methods, devices and computer program products for encoding and decoding a stereo audio signal based on an input signal. According to the disclosure, a hybrid approach of using both parametric stereo coding and a discrete representation of the stereo audio signal is used which may improve the quality of the encoded and decoded audio for certain bitrates.

10 Claims, 6 Drawing Sheets

600

Related U.S. Application Data continuation of application No. 16/827,414, filed on Mar. 23, 2020, now Pat. No. 11,631,417, which is a division of application No. 16/195,745, filed on Nov. 19, 2018, now Pat. No. 10,600,429, which is a continuation of application No. 15/410,377, filed on Jan. 19, 2017, now Pat. No. 10,163,449, which is a continuation of application No. 14/781,712, filed as application No. PCT/EP2014/056854 on Apr. 4, 2014, now Pat. No. 9,570,083.

(60) Provisional application No. 61/808,684, filed on Apr. 5, 2013.

(51) Int. Cl.

| | |
|---|---|
| ***G10L 19/02*** | (2013.01) |
| ***G10L 19/16*** | (2013.01) |
| ***G10L 19/26*** | (2013.01) |
| ***G10L 25/06*** | (2013.01) |
| ***H04S 1/00*** | (2006.01) |

(52) U.S. Cl.
CPC ........ *G10L 19/0204* (2013.01); *G10L 19/167* (2013.01); *G10L 25/06* (2013.01); *H04S 1/007* (2013.01); *G10L 19/0212* (2013.01); *G10L 19/265* (2013.01); *H04S 2400/03* (2013.01); *H04S 2420/03* (2013.01)

(58) Field of Classification Search
CPC ... G10L 19/06; G10L 19/0212; G10L 19/265; H04S 1/007; H04S 2400/03; H04S 2420/03
USPC ...................................................... 381/22, 23
See application file for complete search history.

(56) References Cited

U.S. PATENT DOCUMENTS

| | | | |
|---|---|---|---|
| 6,708,145 | B1 | 3/2004 | Liljeryd |
| 7,006,636 | B2 | 2/2006 | Baumgarte et al. |
| 7,039,204 | B2 | 5/2006 | Baumgarte |
| 7,292,901 | B2 | 11/2007 | Baumgarte et al. |
| 7,573,912 | B2 | 8/2009 | Lindblom |
| 7,583,805 | B2 | 9/2009 | Baumgarte et al. |
| 7,620,554 | B2 | 11/2009 | Ojanpera |
| 7,644,003 | B2 | 1/2010 | Baumgarte |
| 7,693,721 | B2 | 4/2010 | Baumgarte |
| 7,933,415 | B2 | 4/2011 | Breebaart |
| 7,941,320 | B2 | 5/2011 | Baumgarte |
| 8,200,500 | B2 | 6/2012 | Baumgarte |
| 8,255,231 | B2 | 8/2012 | Falck |
| 8,290,167 | B2 | 10/2012 | Pulkki |
| 8,331,572 | B2 | 12/2012 | Breebaart |
| 8,340,302 | B2 | 12/2012 | Breebaart |
| 9,082,395 | B2 | 7/2015 | Heiko |
| 2007/0219808 | A1 | 9/2007 | Herre |
| 2007/0244706 | A1 | 10/2007 | Tsushima |
| 2008/0077412 | A1 | 3/2008 | Oh |
| 2008/0250913 | A1 | 10/2008 | Gerrits |
| 2009/0083040 | A1 | 3/2009 | Myburg |
| 2010/0094631 | A1 | 4/2010 | Engdegard et al. |
| 2010/0121632 | A1 | 5/2010 | Chong |
| 2011/0173006 | A1 | 7/2011 | Nagel |
| 2012/0002818 | A1* | 1/2012 | Heiko .................. G10L 19/002 381/23 |

FOREIGN PATENT DOCUMENTS

| | | | |
|---|---|---|---|
| CA | 3057366 | C | 10/2020 |
| CN | 1357136 | | 7/2002 |
| CN | 1524400 | A | 8/2004 |
| CN | 1809872 | B | 7/2006 |
| CN | 101036183 | | 9/2007 |
| CN | 101518083 | B | 8/2009 |
| CN | 101529503 | B | 9/2009 |
| CN | 101540171 | B | 9/2009 |
| CN | 101939782 | B | 12/2012 |
| CN | 101925950 | B | 10/2013 |
| CN | 102388417 | B | 10/2015 |
| EP | 1721312 | | 9/2005 |
| EP | 1500082 | | 2/2007 |
| EP | 1500084 | | 1/2008 |
| EP | 1914722 | | 4/2008 |
| EP | 1881486 | | 3/2009 |
| EP | 2065885 | | 6/2009 |
| EP | 2077551 | | 7/2009 |
| EP | 1565036 | | 6/2010 |
| EP | 1749296 | | 7/2010 |
| EP | 2130403 | | 8/2010 |
| EP | 2224430 | | 9/2010 |
| EP | 2019391 | B1 | 1/2013 |
| JP | 2011101406 | A | 5/2011 |
| JP | 2013-511752 | | 4/2013 |
| KR | 20030076576 | A | 9/2003 |
| KR | 1020120006010 | U | 1/2012 |
| RU | 2422987 | C2 | 6/2011 |
| RU | 2011108927 | | 9/2012 |
| WO | 2009/067741 | | 6/2009 |
| WO | 2009/115211 | | 9/2009 |
| WO | 2010/105926 | | 9/2010 |
| WO | 2011/039195 | | 4/2011 |
| WO | 2011/124621 | | 10/2011 |

OTHER PUBLICATIONS

Bosi, M. et al "Advanced Audio Coding" ISO/IEC MPEG 2, Journal of the Audio Engineering Society, vol. 45, No. 10, 1997, pp. 789-814.

ETSI TS 126 404 V6.0.0 (Sep. 2004) Universal Mobile Telecommunications System (UMTS); General Audio Codec Audio Processing Functions; Enhanced aacPlus General Audio Code; Encoder Specification; Spectral Band Replication (SBR) part (3GPP TS 26.404 version 6.0.0 Release 6).

ETSI TS 126 404. Enhanced aacPlus general audio codec Encoder specification Spectral Band Replication (SBR) part. 3GPP TS 26.404 version 6.0.0 Release 6. (Sep. 2004).

ETSI TS 126 405. Enhanced aacPlus general audio codec Encoder specification Parametric Stereo part. 3GPP TS 26.405 version 6.0.0 Release 6 (Mar. 2005).

ISO/IEC 23003-3:2012, Information Technology—MPEG Audio Technologies—Part 3: Unified Speech and Audio Coding, Mar. 23, 2012, 278 pages.

ISO/IEC FDIS 23003-3:2011, ISO/IEC JTC1/SC29/WG11, Sep. 20, 2011.

Kosuke Tsujino et al: "Low-complexity Bandwidth Extension in MDCT domain for low-bitrate speech coding", Acoustics, Speech and Signal Processing, 2009. ICASSP 2009. IEEE International Conference On, IEEE, Piscataway, NJ, USA, Apr. 19, 2009 (Apr. 19, 2009), pp. 4145-4148, XP031460187.

Nagel Frederik, et al. "A Harmonic Bandwidth Extension Method for Audio Codecs", IEEE International Conference on Acoustics, Speech and Signal Processing (ICASSP 2009).

ISO/IEC JTC 1/SC 29/WG 11 N9500, ISO/IEC 14496-3, MPEG-4 Audio Fourth Edition, Subpart 4: General Audio Coding (GA)—AAC, TwinVQ, BSAC, May 15, 2009.

* cited by examiner

STEREO AUDIO ENCODER AND DECODER

CROSS-REFERENCE TO RELATED APPLICATIONS

The present application is a continuation of U.S. patent application Ser. No. 18/295,701, filed Apr. 4, 2023, which is a continuation of U.S. patent application Ser. No. 16/827,414, filed Mar. 23, 2020 (now U.S. Pat. No. 11,631,417), which is a divisional of U.S. patent application Ser. No. 16/195,745, filed Nov. 19, 2018 (now U.S. Pat. No. 10,600,429), which is a continuation of U.S. patent application Ser. No. 15/410,377, filed Jan. 19, 2017 (now U.S. Pat. No. 10,163,449), which is a continuation of U.S. patent application Ser. No. 14/781,712, filed Oct. 1, 2015 (now U.S. Pat. No. 9,570,083), which is the United States National Stage Entry of International Patent Application No. PCT/EP2014/056854, filed Apr. 4, 2014, which claims priority to U.S. Provisional Patent Application No. 61/808,684, filed Apr. 5, 2013, each of which are incorporated herein by reference.

TECHNICAL FIELD OF THE INVENTION

The disclosure herein generally relates to stereo audio coding. In particular it relates to a decoder and an encoder for hybrid coding comprising a downmix and discrete stereo coding.

BACKGROUND OF THE INVENTION

In conventional stereo audio coding, possible coding schemes include parametric stereo coding techniques which are used in low bitrate applications. At intermediate rates, Left/Right (L/R) or Mid/Side (M/S) waveform stereo coding is often used. The existing distribution formats and the associated coding techniques may be improved from the point of view of their bandwidth efficiency, especially in applications with a bitrate in between the low bitrate and the intermediate bitrate.

An attempt to improve the efficiency of the audio distribution in a stereo audio system is made in the Unified Speech and Audio Coding (USAC) standard. The USAC standard introduces a low bandwidth waveform-coding based stereo coding in combination with parametric stereo coding techniques. However, the solution proposed by USAC uses the parametric stereo parameters to guide the stereo coding in the modified discrete cosine transform (MDCT) domain in order to do something more efficient than plain M/S or L/R coding. The drawback with the solution is that it may be difficult to get the best out of the low bandwidth waveform based stereo coding in the MDCT domain based on parametric stereo parameters extracted and calculated in a Quadrature Mirror Filters (QMF) domain.

In view of the above, further improvement may be needed to solve or at least reduce one or several of the drawbacks discussed above.

BRIEF DESCRIPTION OF THE DRAWINGS

Example embodiments will now be described with reference to the accompanying drawings, on which.

All the figures are schematic and generally only show parts which are necessary in order to elucidate the disclosure, whereas other parts may be omitted or merely suggested. Unless otherwise indicated, like reference numerals refer to like parts in different figures.

DETAILED DESCRIPTION

I. Overview—Decoder

Figure 1:
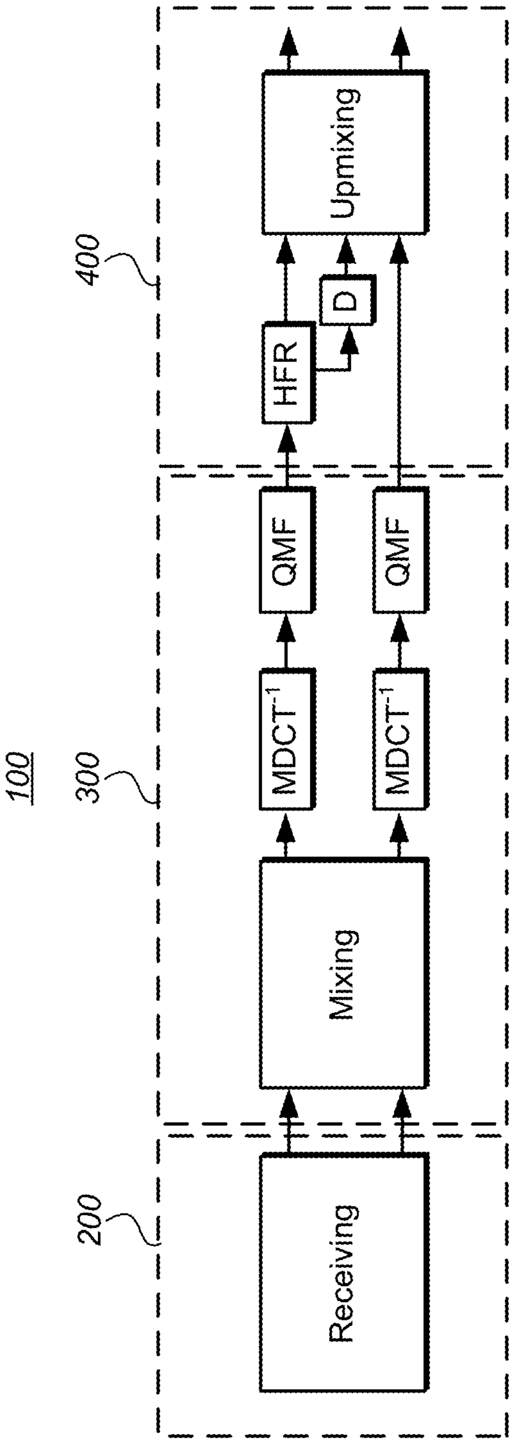
FIG. 1 is a generalized block diagram of a decoding system in accordance with an example embodiment.

As used herein, left-right coding or encoding means that the left (L) and right (R) stereo signals are coded without performing any transformation between the signals.

As used herein, sum- and difference coding or encoding means that the sum M of the left and right stereo signals are coded as one signal (sum) and the difference S between the left and right stereo signal are coded as one signal (difference). The sum-and-difference coding may also be called mid-side coding. The relation between the left-right form and the sum-difference form is thus M=L+R and S=L−R. It may be noted that different normalizations or scaling are possible when transforming left and right stereo signals into the sum- and difference form and vice versa, as long as the transforming in both directions matches. In this disclosure, M=L+R and S=L−R is primarily used, but a system using a different scaling, e.g. M=(L+R)/2 and S=(L−R)/2 works equally well.

As used herein, downmix-complementary (dmx/comp) coding or encoding means subjecting the left and right stereo signal to a matrix multiplication depending on a weighting parameter a prior to coding. The dmx/comp coding may thus also be called dmx/comp/a coding. The relation between the downmix-complementary form, the left-right form, and the sum-difference form is typically dmx=L+R=M, and comp=(1−a)L−(1+a)R=−aM+S. Notably, the downmix signal in the downmix-complementary representation is thus equivalent to the sum signal M of the sum-and-difference representation.

As used herein, an audio signal may be a pure audio signal, an audio part of an audiovisual signal or multimedia signal or any of these in combination with metadata.

According to a first aspect, example embodiments propose methods, devices and computer program products, for decoding a stereo channel audio signal based on an input signal. The proposed methods, devices and computer program products may generally have the same features and advantages.

According to example embodiments, a decoder for decoding two audio signals is provided. The decoder comprises a receiving stage configured to receive a first signal and a second signal corresponding to a time period of the two audio signals, wherein the first signal comprises a first waveform-coded signal comprising spectral data corresponding to frequencies up to a first cross-over frequency and a waveform-coded downmix signal comprising spectral data corresponding to frequencies above the first cross-over frequency, and wherein the second signal comprises a second waveform-coded signal comprising spectral data corresponding to frequencies up to the first cross-over frequency;

The decoder further comprises a mixing stage downstream of the receiving stage. The mixing stage is configured to check whether the first and the second signal waveform-coded signal are in a sum-and-difference form for all frequencies up to the first cross-over frequency, and if not, to transform the first and the second waveform-coded signal into a sum-and-difference form such that the first signal is a combination of a waveform-coded sum-signal comprising spectral data corresponding to frequencies up to the first cross-over frequency and the waveform-coded downmix signal comprising spectral data corresponding to frequencies above the first cross-over frequency, and the second signal comprises a waveform-coded difference-signal comprising spectral data corresponding to frequencies up to the first cross-over frequency.

The decoder further comprises an upmixing stage downstream of the mixing stage configured to upmix the first and the second signal so as to generate a left and a right channel of a stereo signal, wherein for frequencies below the first cross-over frequency the upmixing stage is configured to perform an inverse sum-and-difference transformation of the first and the second signal, and for frequencies above the first cross-over frequency the upmixing stage is configured to perform parametric upmixing of the downmix signal of the first signal.

An advantage of having the lower frequencies purely waveform-coded, i.e. a discrete representation of the stereo audio signal, may be that the human ear is more sensitive to the part of the audio having low frequencies. By coding this part with a better quality, the overall impression of the decoded audio may increase.

An advantage of having a parametric stereo coded part of the first signal, i.e. the waveform-coded downmix signal, and the mentioned discrete representation of the stereo audio signal is that this may improve the quality of the decoded audio signal for certain bit rates compared to using a conventional parametric stereo approach. At bitrates around 32-40 kilobits per second (kbps), the parametric stereo model may saturate, i.e. the quality of the decoded audio signal is limited by the shortcomings of the parametric model and not by lack of bits for coding. Consequently, for bitrates from around 32 kbps, it may be more beneficial to use bits on waveform-coding lower frequencies. At the same time, the hybrid approach of using both the parametric stereo coded part of the first signal and the discrete representation of the distributed stereo audio signal is that this may improve the quality of the decoded audio for certain bitrates, for example below 48 kbps, compared to using an approach where all bits are used on waveform-coding lower frequencies and using spectral band replication (SBR) for the remaining frequencies.

The decoder is thus advantageously used for decoding a two channel stereo audio signal.

According to another embodiment, the transforming of the first and the second waveform-coded signal into a sum-and-difference form in the mixing stage is performed in an overlapping windowed transform domain. The overlapping windowed transform domain may for example be a Modified Discrete Cosine Transform (MDCT) domain. This may be advantageous since the transformation of other available audio distributions formats, such as a left/right form or a dmx/comp-form, into the sum-and-difference form is easy to achieve in the MDCT domain. Consequently, the signals may be encoded using different formats for at least a subset of the frequencies below the first cross-over frequency depending on the characteristics of the signal being encoded. This may allow for an improved coding quality and coding efficiency.

According to yet another embodiment, the upmixing of the first and the second signal in the upmixing stage is performed in a Quadrature Mirror Filters, QMF, domain. The upmixing is performed so as to generate a left and a right stereo signal.

According to another embodiment, the waveform-coded downmix signal comprises spectral data corresponding to frequencies between the first cross-over frequency and a second cross-over frequency. High frequency reconstruction (HFR) parameters are received by the decoder, for example at the receiving stage and then sent to a high frequency reconstruction stage for extending the downmix signal of the first signal to a frequency range above the second cross-over frequency by performing high frequency reconstruction using the high frequency reconstruction parameters. The high frequency reconstruction may for example comprise performing spectral band replication, SBR.

An advantage of having a waveform-coded downmix signal that only comprises spectral data corresponding to frequencies between the first cross-over frequency and a second cross-over frequency is that the required bit transmission rate for the stereo system may be decreased. Alternatively, the bits saved by having a band pass filtered downmix signal are used on waveform-coding lower frequencies, for example the quantization for those frequencies may be finer or the first cross-over frequency may be increased.

Since, as mentioned above, the human ear is more sensitive to the part of the audio signal having low frequencies, high frequencies, such as the part of the audio signal having frequencies above the second cross-over frequency, may be recreated by high frequency reconstruction without reducing the perceived audio quality of the decoded audio signal.

According to a further embodiment the downmix signal of the first signal is extended to a frequency range above the second cross-over frequency prior to the upmixing of the first and the second signal is performed. This may be advantageous since the upmixing stage will have and input sum-signal with spectral data corresponding to all frequencies.

According to a further embodiment the downmix signal of the first signal is extended to a frequency range above the second cross-over frequency after transforming the first and the second waveform-coded signal into a sum-and-difference form. This may be advantageous since given that the downmix signal corresponds to the sum-signal in the sum-and-difference representation, the high frequency reconstruction stage will have an input signal with spectral data corresponding to frequencies up to the second cross-over frequency represented in the same form, i.e. in the sum-form.

According to another embodiment, the upmixing in the upmixing stage is done with use of upmix parameters. The upmix parameters are received by the decoder, for example at the receiving stage and sent to the upmixing stage. A decorrelated version of the downmix signal is generated and the downmix signal and the decorrelated version of the downmix signal are subjected to a matrix operation. The parameters of the matrix operation are given by the upmix parameters.

According to a further embodiment, the first and the second waveform coded signal, received at the receiving stage, are waveform-coded in a left-right form, a sum-difference form and/or a downmix-complementary form wherein the complementary signal depends on a weighting parameter a being signal adaptive. The waveform-coded signals may thus be coded on different forms depending on the characteristics of the signals and still be decodable by the decoder. This may allow for an improved coding quality and thus an improved quality of the decoded audio stereo signal given a certain bitrate of the system. In a further embodiment, the weighting parameter a is real-valued. This may simplify the decoder since no extra stage approximating the imaginary part of the signal is needed. A further advantage is that the computational complexity of the decoder may be decreased which may also lead to a decreased decoding delay/latency of the decoder.

According to yet another embodiment, the first and the second waveform coded signal, received at the receiving stage, are waveform-coded in a sum-difference form. This means that the first and the second signal can be coded using overlapping windowed transforms with independent windowing for the first and the second signal, respectively, and still be decodable by the decoder. This may allow for an improved coding quality and thus an improved quality of the decoded audio stereo signal given a certain bitrate of the system. For example, if a transient is detected in the sum signal but not in the difference signal, the waveform coder may code the sum signal with shorter windows while for the difference signal, the longer default windows may be kept. This may provide higher coding efficiency compared to if the side signal also was coded with the shorter window sequence.

II. Overview—Encoder

According to a second aspect, example embodiments propose methods, devices and computer program products for encoding a stereo channel audio signal based on an input signal.

The proposed methods, devices and computer program products may generally have the same features and advantages.

Advantages regarding features and setups as presented in the overview of the decoder above may generally be valid for the corresponding features and setups for the encoder.

According to the example embodiments, an encoder for encoding two audio signals is provided. The encoder comprises a receiving stage configured to receive a first signal and a second signal, corresponding to a time period of the two signals, to be encoded.

The encoder further comprises a transforming stage configured to receive the first and the second signal from the receiving stage and to transform them into a first transformed signal being a sum signal and a second transformed signal being a difference signal.

The encoder further comprises a waveform-coding stage configured to receive the first and the second transformed signal from the transforming stage and to waveform-code them into a first and a second waveform-coded signal, respectively, wherein for frequencies above a first cross-over frequency the waveform-coding stage is configured to waveform-code the first transformed signal, and wherein for frequencies up to the first cross-over frequency the waveform-coding stage is configured to waveform-code the first and the second transformed signal.

The encoder further comprises a parametric stereo encoding stage configured to receive the first and the second signal from the receiving stage and to subject the first and the second signal to parametric stereo encoding in order to extract parametric stereo parameters enabling reconstruction of spectral data of the first and the second signal for frequencies above the first cross-over frequency;

The encoder further comprises a bitstream generating stage configured to receive the first and the second waveform-coded signal from the waveform-coding stage and the parametric stereo parameters from the parametric stereo encoding stage, and to generate a bit-stream comprising the first and the second waveform-coded signal and the parametric stereo parameters.

According to another embodiment, the transforming of the first and the second signal in the transforming stage is performed in the time domain.

According to another embodiment, for at least a subset of the frequencies below the first cross-over frequency, the encoder may transform the first and the second waveform-coded signal into a left/right form by performing an inverse sum- and difference transformation.

According to another embodiment, for at least a subset of the frequencies below the first cross-over frequency, the encoder may transform the first and the second waveform-coded signal into a downmix/complementary form by performing a matrix operation on the first and the second waveform-coded signals, the matrix operation depending on a weighting parameter a. The weighting parameter a may then be included in the bitstream in bitstream generating stage.

According to yet another embodiment, for frequencies above the first cross-over frequency, waveform-coding the first and the second transformed signal in the transforming stage comprises waveform-coding the first transformed signal for frequencies between the first cross-over frequency and a second cross-over frequency and setting the first waveform-coded signal to zero above the second cross-over frequency. A downmix signal of the first signal and the second signal may then be subjected to a high frequency reconstruction encoding in a high frequency reconstruction stage in order to generate high frequency reconstruction parameters enabling high frequency reconstruction of the downmix signal. The high frequency reconstruction parameters may then be included in the bitstream in the bitstream generating stage.

According to a further embodiment, downmix signal is calculated based on the first and the second signal.

According to another embodiment, subjecting the first and the second signal to parametric stereo encoding in the parametric stereo encoding stage is performed by first transforming the first and the second signal into a first transformed signal being a sum signal and a second transformed signal being a difference signal, and then subjecting the first and the second transformed signal to parametric stereo encoding, wherein the downmix signal being subject to high frequency reconstruction encoding is the first transformed signal.

III. Example Embodiments

FIG. 1 is a generalized block diagram of a decoding system 100 comprising three conceptual parts 200, 300, 400 that will be explained in greater detail in conjunction with FIG. 2-4 below. In first conceptual part 200, a bit stream is received and decoded into a first and a second signal. The first signal comprises both a first waveform-coded signal comprising spectral data corresponding to frequencies up to a first cross-over frequency and a waveform-coded downmix signal comprising spectral data corresponding to frequencies above the first cross-over frequency. The second signal only comprises a second waveform-coded signal comprising spectral data corresponding to frequencies up to the first cross-over frequency.

In the second conceptual part 300, in case the waveform-coded parts of the first and second signal is not in a sum-and-difference form, e.g. in an M/S form, the waveform-coded parts of the first and second signal are transformed to the sum-and-difference form. After that, the first and the second signal are transformed into the time domain and then into the Quadrature Mirror Filters, QMF, domain. In the third conceptual part 400, the first signal is high frequency reconstructed (HFR). Both the first and the second signal is then upmixed to create a left and a right stereo signal output having spectral coefficients corresponding to the entire frequency band of the encoded signal being decoded by the decoding system 100.

Figure 2:
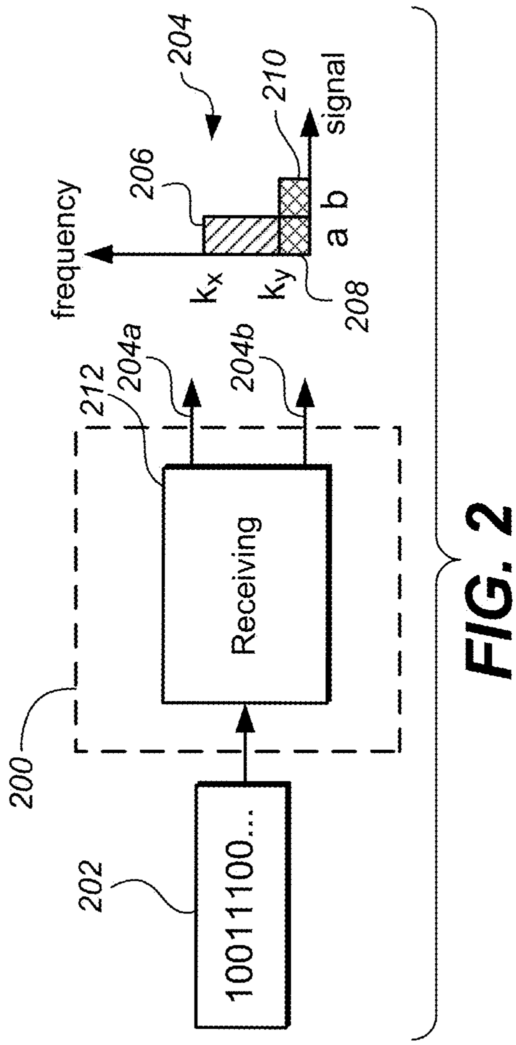
FIG. 2 illustrates a first part of the decoding system in FIG. 1.

FIG. 2 illustrates the first conceptual part 200 of the decoding system 100 in FIG. 1. The decoding system 100 comprises a receiving stage 212. In the receiving stage 212, a bit stream frame 202 is decoded and dequantizing into a first signal 204*a* and a second signal 204*b*. The bit stream frame 202 corresponds to a time period of the two audio signals being decoded. The first signal 204*a* comprises a first waveform-coded signal 208 comprising spectral data corresponding to frequencies up to a first cross-over frequency $k_y$ and a waveform-coded downmix signal 206 comprising spectral data corresponding to frequencies above the first cross-over frequency $k_y$. By way of example, the first cross-over frequency $k_y$ is 1.1 kHz.

According to some embodiments, the waveform-coded downmix signal 206 comprises spectral data corresponding to frequencies between the first cross-over frequency $k_y$ and a second cross-over frequency $k_x$. By way of example, the second cross-over frequency $k_x$ lies within the range of is 5.6-8 kHz.

The received first and second wave-form coded signals 208, 210 may be waveform-coded in a left-right form, a sum-difference form and/or a downmix-complementary form wherein the complementary signal depends on a weighting parameter a being signal adaptive. The waveform-coded downmix signal 206 corresponds to a downmix suitable for parametric stereo which, according to the above, corresponds to a sum form. However, the signal 204*b* has no content above the first cross-over frequency $k_y$. Each of the signals 206, 208, 210 is represented in a modified discrete cosine transform (MDCT) domain.

Figure 3:
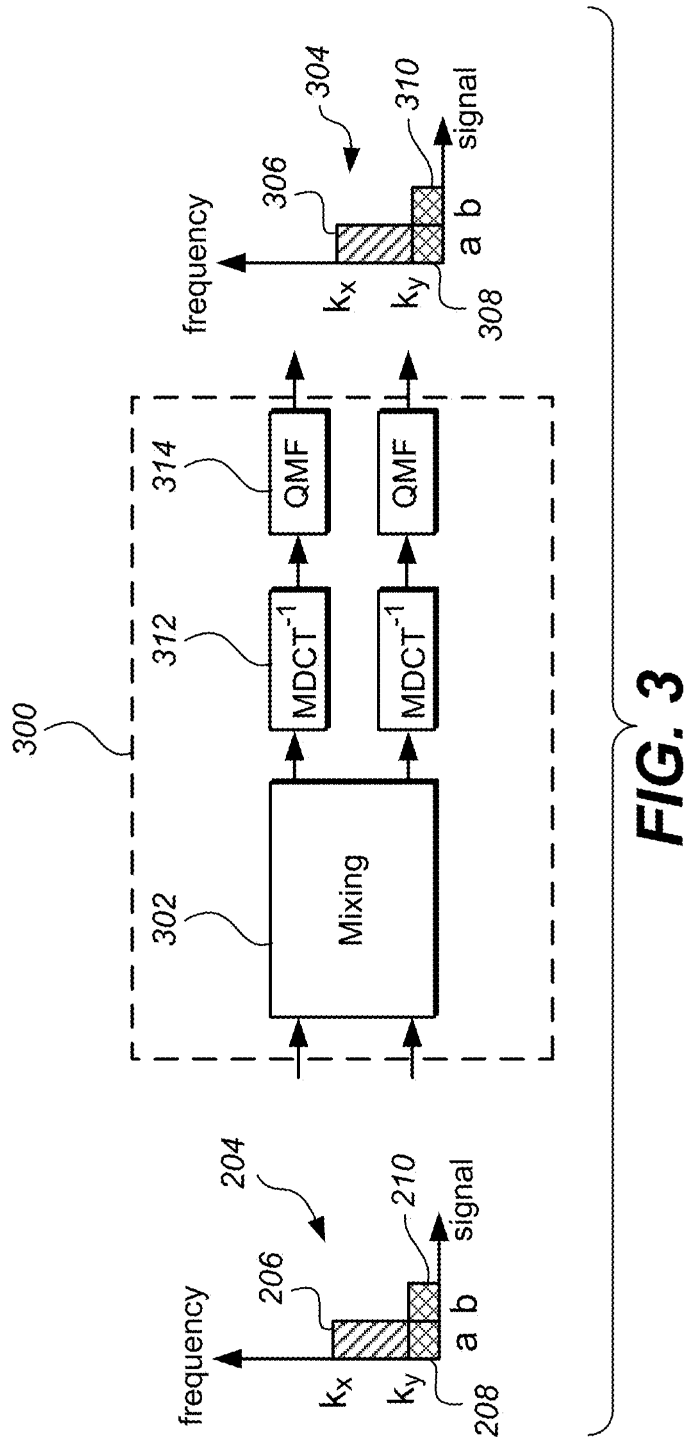
FIG. 3 illustrates a second part of the decoding system in FIG. 1.

FIG. 3 illustrates the second conceptual part 300 of the decoding system 100 in FIG. 1. The decoding system 100 comprises a mixing stage 302. The design of the decoding system 100 requires that the input to the high frequency reconstruction stage, which will be described in greater detail below, needs to be in a sum-format. Consequently, the mixing stage is configured to check whether the first and the second signal waveform-coded signal 208, 210 are in a sum-and-difference form. If the first and the second signal waveform-coded signal 208, 210 are not in a sum-and-difference form for all frequencies up to the first cross-over frequency $k_y$, the mixing stage 302 will transform the entire waveform-coded signal 208, 210 into a sum-and-difference form. In case at least a subset of the frequencies of the input signals 208, 210 to the mixing stage 302 is in a downmix-complementary form, the weighting parameter a is required as an input to the mixing stage 302. It may be noted that the input signals 208, 210 may comprise several subsets of frequencies coded in a downmix-complementary form and that in that case each subset does not have to be coded with use of the same value of the weighting parameter a. In this case, several weighting parameters a are required as an input to the mixing stage 302.

As mentioned above, the mixing stage 302 always output a sum-and-difference representation of the input signals 204*a-b*. To be able to transform signals represented in the MDCT domain into the sum-and-difference representation, the windowing of the MDCT coded signals need to be the same. This implies that, in case the first and the second signal waveform-coded signal 208, 210 are in a L/R or downmix-complementary form, the windowing for the signal 204*a* and the windowing for the signal 204*b* cannot be independent Consequently, in case the first and the second signal waveform-coded signal 208, 210 is in a sum-and-difference form, the windowing for the signal 204*a* and the windowing for the signal 204*b* may be independent.

After the mixing stage 302, the sum-and-difference signal is transformed into the time domain by applying an inverse modified discrete cosine transform ($MDCT^{-1}$) 312.

The two signals 304*a-b* are then analyzed with two QMF banks 314. Since the downmix signal 306 does not comprise the lower frequencies, there is no need of analyzing the signal with a Nyquist filterbank to increase frequency resolution. This may be compared to systems where the downmix signal comprises low frequencies, e.g. conventional parametric stereo decoding such as MPEG-4 parametric stereo. In those systems, the downmix signal needs to be analyzed with the Nyquist filterbank in order to increases the frequency resolution beyond what is achieved by a QMF bank and thus better match the frequency selectivity of the human auditory system, as e.g. represented by the Bark frequency scale.

The output signal 304 from the QMF banks 314 comprises a first signal 304*a* which is a combination of a waveform-coded sum-signal 308 comprising spectral data corresponding to frequencies up to the first cross-over frequency $k_y$ and the waveform-coded downmix signal 306 comprising spectral data corresponding to frequencies between the first cross-over frequency $k_y$ and the second cross-over frequency $k_x$. The output signal 304 further comprises a second signal 304*b* which comprises a waveform-coded difference-signal 310 comprising spectral data corresponding to frequencies up to the first cross-over frequency $k_y$. The signal 304*b* has no content above the first cross-over frequency $k_y$.

As will be described later on, a high frequency reconstruction stage 416 (shown in conjunction with FIG. 4) uses the lower frequencies, i.e. the first waveform-coded signal 308 and the waveform-coded downmix signal 306 from the output signal 304, for reconstructing the frequencies above the second cross-over frequency $k_x$. It is advantageous that the signal on which the high frequency reconstruction stage 416 operates on is a signal of similar type across the lower frequencies. From this perspective it is advantageous to have the mixing stage 302 to always output a sum-and-difference representation of the first and the second signal waveform-coded signal 208, 210 since this implies that the first waveform-coded signal 308 and the waveform-coded downmix signal 306 of the outputted first signal 304*a* are of similar character.

Figure 4:
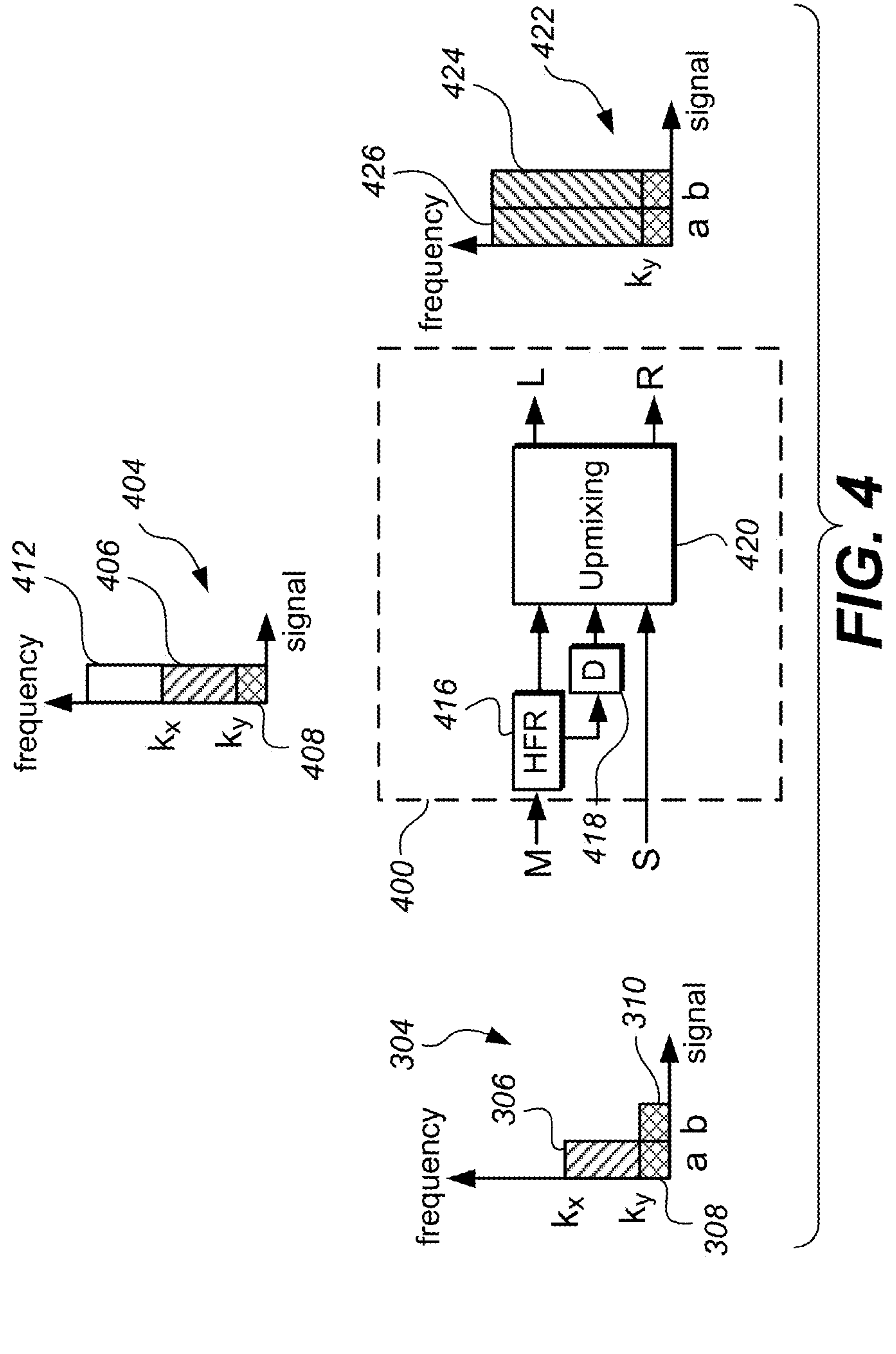
FIG. 4 illustrates a third part of the decoding system in FIG. 1.

FIG. 4 illustrates the third conceptual part 400 of the decoding system 100 in FIG. 1. The high frequency reconstruction (HRF) stage 416 is extending the downmix signal 306 of the first signal input signal 304*a* to a frequency range above the second cross-over frequency $k_x$ by performing high frequency reconstruction. Depending on the configuration of the HFR stage 416, the input to the HFR stage 416 is the entire signal 304*a* or the just the downmix signal 306. The high frequency reconstruction is done by using high frequency reconstruction parameters which may be received by high frequency reconstruction stage 416 in any suitable way. According to an embodiment, the performed high frequency reconstruction comprises performing spectral band replication, SBR.

The output from the high frequency reconstruction stage 314 is a signal 404 comprising the downmix signal 406 with the SBR extension 412 applied. The high frequency reconstructed signal 404 and the signal 304*b* is then fed into an upmixing stage 420 so as to generate a left L and a right R stereo signal 412*a-b*. For the spectral coefficients corresponding to frequencies below the first cross-over frequency $k_y$ the upmixing comprises performing an inverse sum-and-difference transformation of the first and the second signal 408, 310. This simply means going from a mid-side representation to a left-right representation as outlined before. For the spectral coefficients corresponding to frequencies over to the first cross-over frequency $k_y$, the downmix signal 406 and the SBR extension 412 is fed through a decorrelator 418. The downmix signal 406 and the SBR extension 412 and the decorrelated version of the downmix signal 406 and the SBR extension 412 is then upmixed using parametric mixing parameters to reconstruct the left and the right cannels 416, 414 for frequencies above the first cross-over frequency $k_y$. Any parametric upmixing procedure known in the art may be applied.

It should be noted that in the above exemplary embodiment 100 of the encoder, shown in FIGS. 1-4, high frequency reconstruction is needed since the first received signal 204*a* only comprises spectral data corresponding to frequencies up to the second cross-over frequency $k_x$. In further embodiments, the first received signal comprises spectral data corresponding to all frequencies of the encoded signal. According to this embodiment, high frequency reconstruction is not needed. The person skilled in the art understands how to adapt the exemplary encoder 100 in this case.

Figure 5:
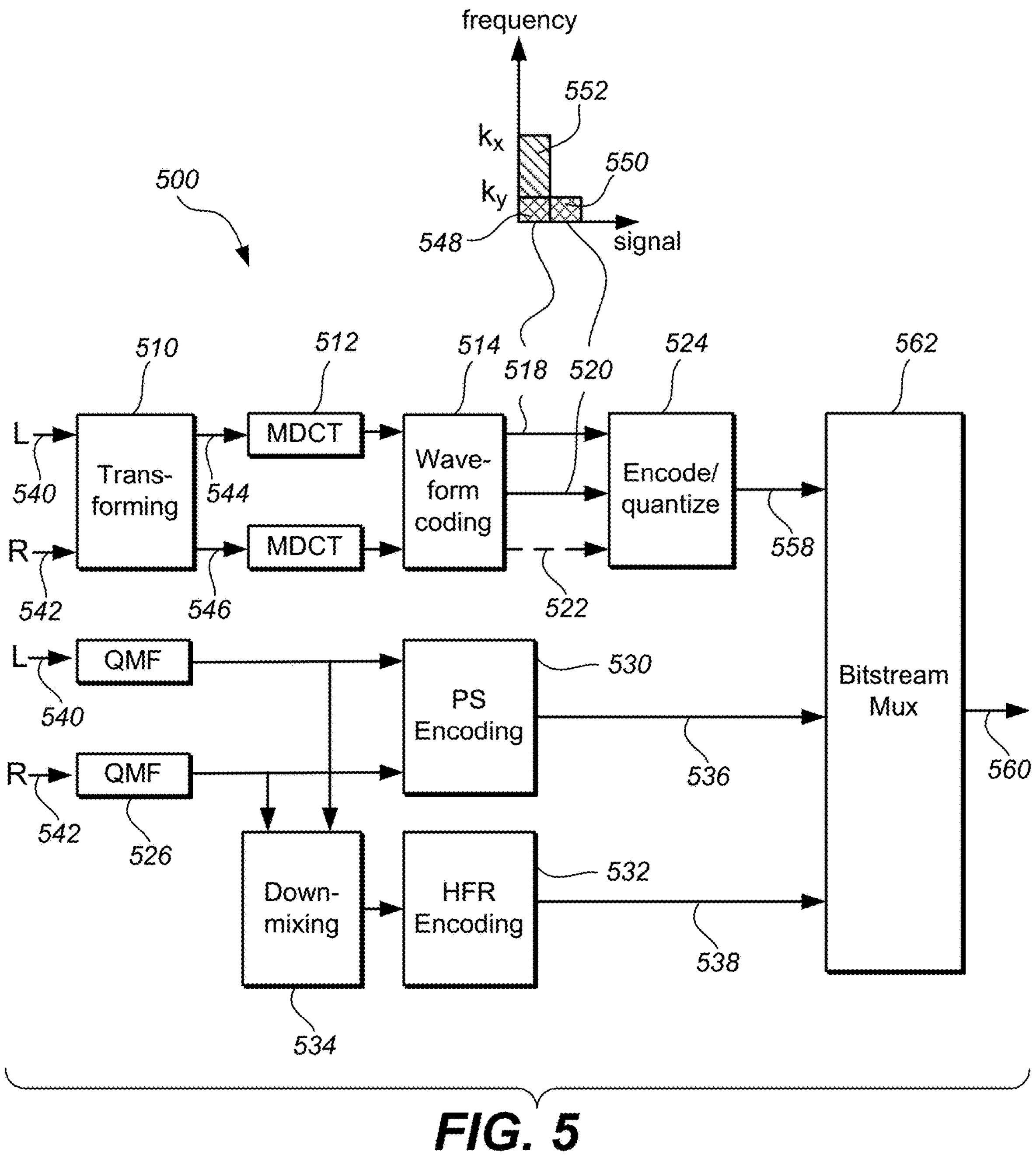
FIG. 5 is a generalized block diagram of an encoding system in accordance with a first example embodiment.

FIG. 5 shows by way of example a generalized block diagram of an encoding system 500 in accordance with an embodiment.

In the encoding system, a first and second signal 540, 542 to be encoded are received by a receiving stage (not shown). These signals 540, 542 represent a time period of the left 540 and the right 542 stereo audio channels. The signals 540, 542 are represented in the time domain. The encoding system comprises a transforming stage 510. The signals 540, 542 are transformed into a sum-and-difference format 544, 546 in the transforming stage 510.

The encoding system further comprising a waveform-coding stage 514 configured to receive the first and the second transformed signal 544, 546 from the transforming stage 510. The waveform-coding stage typically operates in a MDCT domain. For this reason, the transformed signals 544, 546 are subjected to a MDCT transform 512 prior to the waveform-coding stage 514. In the waveform-coding stage, the first and the second transformed signal 544, 546 are waveform-coded into a first and a second waveform-coded signal 518, 520, respectively.

For frequencies above a first cross-over frequency $k_y$, the waveform-coding stage 514 is configured to waveform-code the first transformed signal 544 into a waveform-code signal 552 of the first waveform-coded signal 518. The waveform-coding stage 514 may be configured to set the second waveform-coded signal 520 to zero above the first cross-over frequency $k_y$ or to not encode theses frequencies at all. For frequencies above the first cross-over frequency $k_y$, the waveform-coding stage 514 is configured to waveform-code the first transformed signal 544 into a waveform-coded signal 552 of the first waveform-coded signal 518.

For frequencies below the first cross-over frequency $k_y$, a decision is made in the waveform-coding stage 514 on what kind of stereo coding to use for the two signals 548, 550. Depending on the characteristics of the transformed signals 544, 546 below the first cross-over frequency $k_y$, different decisions can be made for different subsets of the waveform-coded signal 548, 550. The coding can either be Left/Right coding, Mid/Side coding, i.e. coding the sum and difference, or dmx/comp/a coding. In the case the signals 548, 550 are waveform-coded by a sum-and-difference coding in the waveform-coding stage 514, the waveform-coded signals 518, 520 may be coded using overlapping windowed transforms with independent windowing for the signals 518, 520, respectively.

An exemplary first cross-over frequency $k_y$ is 1.1 kHz, but this frequency may be varied depending on the bit transmission rate of the stereo audio system or depending on the characteristics of the audio to be encoded.

At least two signals 518, 520 are thus outputted from the waveform-coding stage 514. In the case one or several subsets, or the entire frequency band, of the signals below the first cross over frequency $k_y$ are coded in a downmix/complementary form by performing a matrix operation, depending on the weighting parameter a, this parameter is also outputted as a signal 522. In the case of several subsets being encoded in a downmix/complementary form, each subset does not have to be coded with use of the same value of the weighting parameter a. In this case, several weighting parameters are outputted as the signal 522.

These two or three signals 518, 520, 522, are encoded and quantized 524 into a single composite signal 558.

To be able to reconstruct the spectral data of the first and the second signal 540, 542 for frequencies above the first cross-over frequency on a decoder side, parametric stereo parameters 536 needs to be extracted from the signals 540, 542. For this purpose the encoder 500 comprises a parametric stereo (PS) encoding stage 530. The PS encoding stage 530 typically operates in a QMF domain. Therefore, prior to being input to the PS encoding stage 530, the first and second signals 540, 542 are transformed to a QMF domain by a QMF analysis stage 526. The PS encoder stage 530 is adapted to only extract parametric stereo parameters 536 for frequencies above the first cross-over frequency $k_y$.

It may be noted that the parametric stereo parameters 536 are reflecting the characteristics of the signal being parametric stereo encoded. They are thus frequency selective, i.e. each parameter of the parameters 536 may correspond to a subset of the frequencies of the left or the right input signal 540, 542. The PS encoding stage 530 calculates the parametric stereo parameters 536 and quantizes these either in a uniform or a non-uniform fashion. The parameters are as mentioned above calculated frequency selective, where the entire frequency range of the input signals 540, 542 is divided into e.g. 15 parameter bands. These may be spaced according to a model of the frequency resolution of the human auditory system, e.g. a bark scale.

In the exemplary embodiment of the encoder 500 shown in FIG. 5, the waveform-coding stage 514 is configured to waveform-code the first transformed signal 544 for frequencies between the first cross-over frequency $k_y$ and a second cross-over frequency $k_x$ and setting the first waveform-coded signal 518 to zero above the second cross-over frequency $k_x$. This may be done to further reduce the required transmission rate of the audio system in which the encoder 500 is a part. To be able to reconstruct the signal above the second cross-over frequency $k_x$, high frequency reconstruction parameters 538 needs to be generated. According to this exemplary embodiment, this is done by downmixing the two signals 540, 542, represented in the QMF domain, at a downmixing stage 534. The resulting downmix signal, which for example is equal to the sum of the signals 540, 542, is then subjected to high frequency reconstruction encoding at a high frequency reconstruction, HFR, encoding stage 532 in order to generate the high frequency reconstruction parameters 538. The parameters 538 may for example include a spectral envelope of the frequencies above the second cross-over frequency $k_x$, noise addition information etc. as well known to the person skilled in the art.

An exemplary second cross-over frequency $k_x$ is 5.6-8 kHz, but this frequency may be varied depending on the bit transmission rate of the stereo audio system or depending on the characteristics of the audio to be encoded.

The encoder 500 further comprises a bitstream generating stage, i.e. bitstream multiplexer, 524. According to the exemplary embodiment of the encoder 500, the bitstream generating stage is configured to receive the encoded and quantized signal 544, and the two parameters signals 536, 538. These are converted into a bitstream 560 by the bitstream generating stage 562, to further be distributed in the stereo audio system.

According to another embodiment, the waveform-coding stage 514 is configured to waveform-code the first transformed signal 544 for all frequencies above the first cross-over frequency $k_y$. In this case, the HFR encoding stage 532 is not needed and consequently no high frequency reconstruction parameters 538 are included in the bit-stream.

Figure 6:
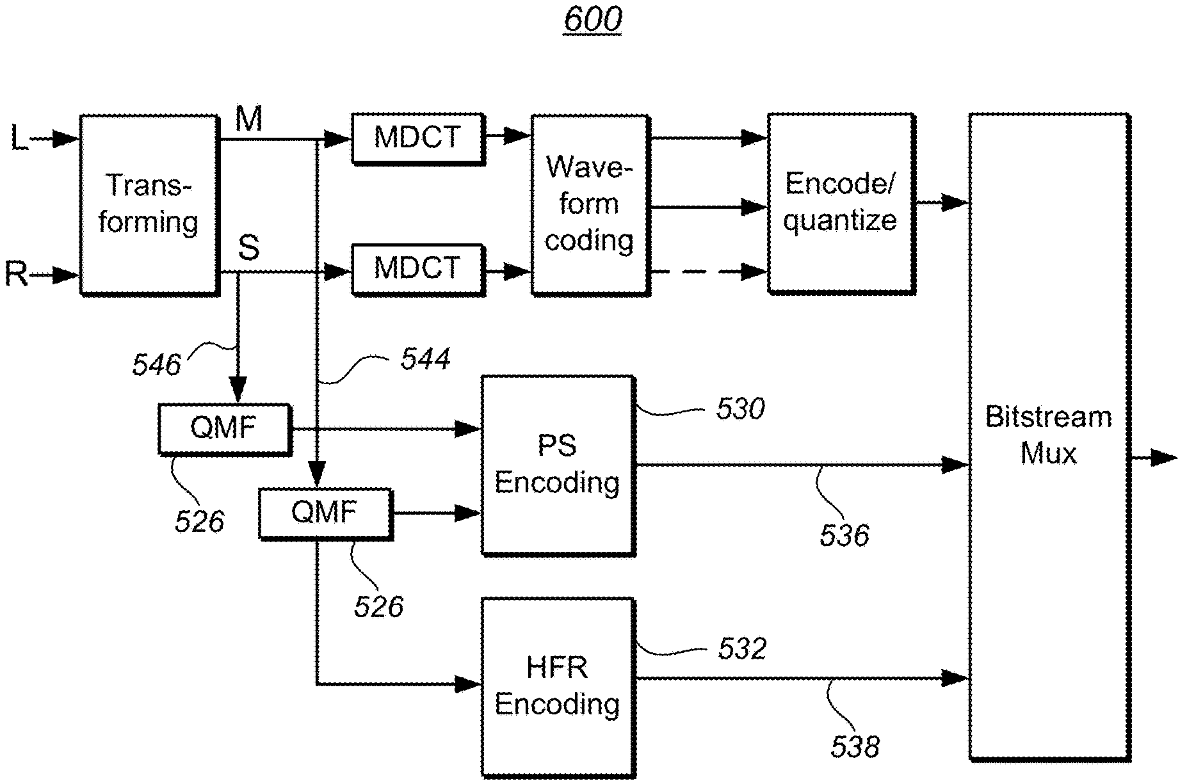
FIG. 6 is a generalized block diagram of an encoding system in accordance with a second example embodiment.

FIG. 6 shows by way of example a generalized block diagram of an encoder system 600 in accordance with another embodiment. This embodiment differs from the embodiment shown in FIG. 5 in that the signals 544, 546 which are transformed by the QMF analysis stage 526 are in a sum-and-difference format. Consequently, there is no need for a separate downmixing stage 534 since the sum signal 544 is already in the form of a downmix signal. The SBR encoding stage 532 thus only needs to operate on the sum-signal 544 to extract the high frequency reconstruction parameters 538. The PS encoder 530 is adapted to operate on both the sum-signal 544 and the difference-signal 546 to extract the parametric stereo parameters 536.

Equivalents, Extensions, Alternatives and Miscellaneous

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method for decoding an encoded audio bitstream, the method comprising:

extracting from the encoded audio bitstream a first waveform-coded signal comprising of spectral coefficients corresponding to frequencies up to a first cross-over frequency for a first time period;

extracting from the encoded audio bitstream a second waveform-coded signal comprising of spectral coefficients corresponding to a subset of frequencies above the first cross-over frequency for the first time period;

performing high frequency reconstruction to extend the subset of frequencies above the first cross-over frequency in order to generate an extended signal for the first time period, wherein the subset of frequencies is extended above a second cross-over frequency, and wherein and the frequency reconstruction is based on noise information; and combining the first waveform-coded signal and the extended signal.

2. The method of claim 1, wherein the first cross-over frequency depends on a bit transmission rate.

3. The method of claim 1, wherein the combining comprises (i) adding the second waveform-coded signal with the extended signal and combining the added result with the first waveform-coded signal, or (ii) combining the second waveform-coded signal with the extended signal and combining the result with the first waveform-coded signal.

4. The method of claim 1, wherein either (i) the combining, or (ii) the performing of high frequency reconstruction is performed in a frequency domain.

5. The method of claim 1, wherein performing high frequency reconstruction comprises performing spectral band replication (SBR).

6. The method of claim 1, wherein the high frequency reconstruction is performed before the combining.

7. The method of claim 1, wherein the audio processing system is a hybrid decoder that performs waveform-decoding and parametric decoding.

8. The method of claim 1, wherein the first waveform-coded signal and second waveform-coded signal share a common bit reservoir using a psychoacoustic model.

9. The method of claim 1, wherein the first waveform-coded signal and the second waveform-coded signal are signals representing a waveform of an audio signal in a frequency domain.

10. A non-transitory computer readable medium comprising instructions that when executed by a processor, cause the processor to perform the method of claim 1.

* * * * *